(12) United States Patent
Nakayama

(10) Patent No.: US 12,214,535 B2
(45) Date of Patent: Feb. 4, 2025

(54) VERTICAL INJECTION MOLDING MACHINE

(71) Applicant: THE JAPAN STEEL WORKS, LTD., Tokyo (JP)

(72) Inventor: Kiyotaka Nakayama, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 189 days.

(21) Appl. No.: 18/174,048

(22) Filed: Feb. 24, 2023

(65) Prior Publication Data

US 2023/0271366 A1 Aug. 31, 2023

(30) Foreign Application Priority Data

Feb. 28, 2022 (JP) .................................. 2022-028820

(51) Int. Cl.
*B29C 45/84* (2006.01)
*B29C 45/03* (2006.01)
*B29C 45/76* (2006.01)

(52) U.S. Cl.
CPC .............. *B29C 45/84* (2013.01); *B29C 45/03* (2013.01); *B29C 45/76* (2013.01)

(58) Field of Classification Search
None
See application file for complete search history.

(56) References Cited

U.S. PATENT DOCUMENTS 5,975,872 A * 11/1999 Raines .................... B29C 45/06
 425/576
2017/0334116 A1 * 11/2017 Iwakura .................. B29C 45/76

FOREIGN PATENT DOCUMENTS

DE 102010048212 A1 * 12/2011 ......... B23Q 11/0082
JP 2020-6644 A 1/2020

* cited by examiner

*Primary Examiner* — Yung-Sheng M Tsui
(74) *Attorney, Agent, or Firm* — Sughrue Mion, PLLC

(57) ABSTRACT

A vertical injection molding machine includes a mold clamping device configured to clamp a mold, an injection device provided on the mold clamping device, the injection device being configured to inject an injection material, a controller including an operation terminal, the operation terminal provided on an operation side of the vertical injection molding machine, and a safety fence surrounding other three sides of the vertical injection molding machine except for the operation side. A light curtain and a cover are provided on the operation side. The light curtain includes a plurality of spaced light sources and the same number of light receiving sensors, the light curtain being configured to detect an entry into the mold clamping device from the operation side. The cover is disposed on or above the light curtain.

9 Claims, 5 Drawing Sheets

VERTICAL INJECTION MOLDING MACHINE

CROSS-REFERENCE TO RELATED APPLICATIONS

This application is based on and claims priority under 35 USC 119 from Japanese Patent Application No. 2022-028820 filed on Feb. 28, 2022, the contents of which are incorporated herein by reference.

TECHNICAL FIELD

The present disclosure is related to a vertical injection molding machine that includes a mold clamping device configured to open and close a mold vertically, an injection device, and a controller including an operation terminal, and in which except for an operation side at which the operation terminal is provided, other three sides are surrounded by a safety fence.

BACKGROUND

A vertical injection molding machine includes a mold clamping device, an injection device, and a controller including an operation terminal, for example, as described in JP2020-006644A. The mold clamping device includes a fixed plate fixed to a frame, an upper movable plate provided above the fixed plate, and a lower movable plate provided below the fixed plate. The upper movable plate and the upper movable plate are connected by a plurality of tie bars, and a mold clamping mechanism such as a toggle mechanism is provided between the lower movable plate and the fixed plate. Depending on a model of the vertical injection molding machine, some vertical injection molding machines have a reversible turntable on the fixed platen. A mold is provided on the fixed plate or turntable and the upper movable plate. Therefore, when the mold clamping mechanism is driven, the molds are opened and closed. The injection device is provided on the upper movable plate and is configured to inject an injection material into the mold.

In a vertical injection molding machine, a side on which the operation terminal is provided is called an operation side, and an opposite side is called a counter-operation side. A safety fence having a predetermined height is provided on the counter-operation side and on both sides of the counter-operation side of the vertical injection molding machine. This protects an operator from accidentally putting a hand into the mold clamping device while the vertical injection molding machine is in operation. On the other hand, the operation side is open. A light curtain including a plurality of light sources and the same number of light receiving sensors for receiving infrared rays emitted from the light sources is provided on the open operation side. When the operator tries to put the hand into the mold clamping device from the operation side, infrared rays are blocked and the entry is detected. For example, if the operator puts in the hand during mold closing, the mold clamping device is safely stopped before the hand reaches hazards. Accordingly, the safety of the operator is ensured.

SUMMARY

In the above-described related-art vertical injection molding machine, as the light curtain is provided on the operation side where the safety fence is provided, the safety of the operator is ensured. However, a height at which entry can be detected by the light curtain is up to a predetermined height from the fixed plate. That is, considering the cost of the light curtain, the height cannot be excessively high. Therefore, entry from above the light curtain cannot be detected. For example, it may not be impossible for the operator to touch the injection device without being detected by the light curtain if the injection device is located above the light curtain. In this case, there is a possibility of injury when the injection device moves up and down due to opening and closing of the molds. That is, it cannot be said that safety is completely guaranteed.

Therefore, illustrative aspects of the present disclosure provide a vertical injection molding machine in which operator safety is sufficiently ensured.

Other problems and novel features will become apparent from the description of this specification and the accompanying drawings.

According to one illustrative aspect of the present disclosure, a vertical injection molding machine is provided with a safety fence surrounding other three sides except for an operation side where the operation terminal is provided. According to the present disclosure, a light curtain and a cover are provided on the operation side in the vertical injection molding machine. The light curtain includes a plurality of spaced light sources and the same number of light receiving sensors. The light curtain is configured to detect an entry into the mold clamping device from the operation side. The cover is disposed on or above the light curtain.

According to the present disclosure, operator safety is sufficiently ensured in a vertical injection molding machine.

DETAILED DESCRIPTION

Illustrative embodiments will be described in detail below with reference to the drawings. Incidentally, the present disclosure is not limited to the following illustrative embodiments. In order to clarify the description, the following description and the drawings are simplified as appropriate. In all the drawings, the same elements are denoted by the same reference signs, and repetitive descriptions thereof are omitted. In addition, hatching may be omitted to avoid complicating the drawings.

The present illustrative embodiment will be described.

Vertical Injection Molding Machine

Figure 1A:
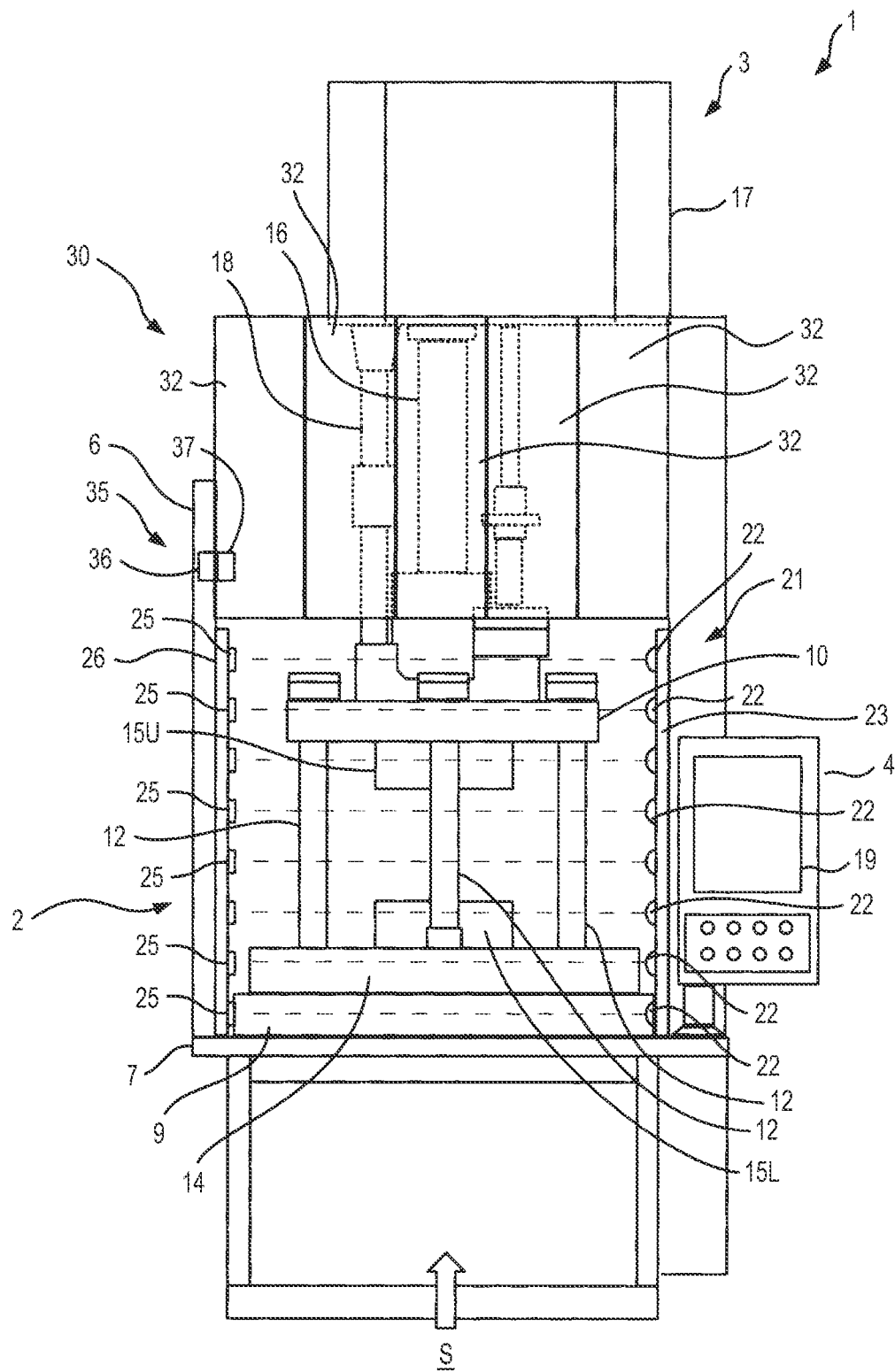
FIGS. 1A and 1B are front views of a vertical injection molding machine according to the present illustrative embodiment.
Figure 1B:
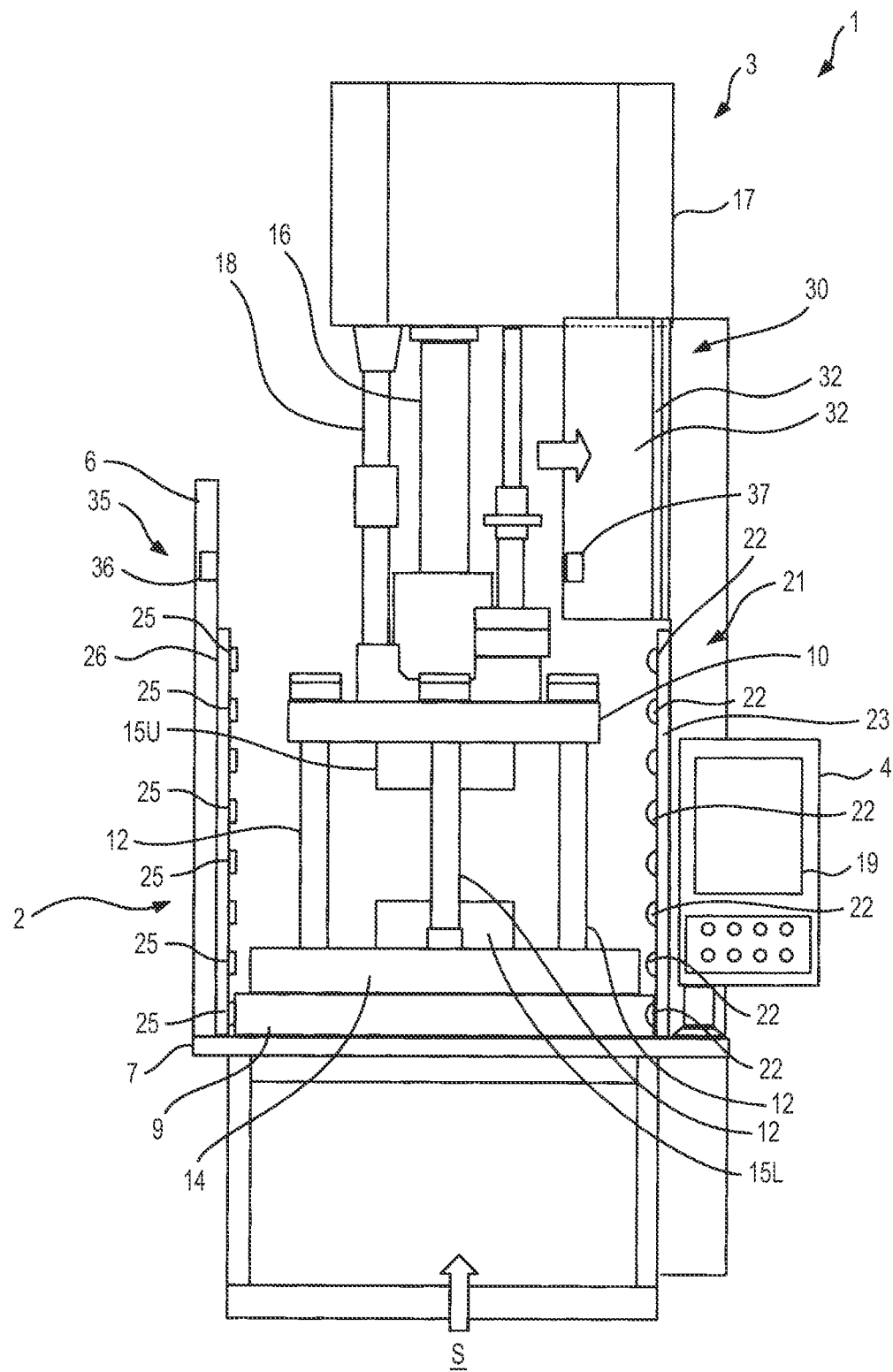

As shown in FIGS. 1A and 1B, a vertical injection molding machine 1 according to the present illustrative embodiment includes a mold clamping device 2, an injection device 3 provided above the mold clamping device 2, a controller 4 for controlling the mold clamping device 2 and the injection device 3, and a safety fence 6 partially covering the mold clamping device 2 and the injection device 3.

Mold Clamping Device

The mold clamping device 2 includes a fixed plate 9 fixed to a bed 7, an upper movable plate 10 provided above the fixed plate 9, and a lower movable plate (not shown) provided in the bed 7. In the present illustrative embodiment, the upper movable plate 10 and the lower movable plate are coupled by three tie bars 12, 12, .... When a mold clamping mechanism (not shown) provided between the lower movable plate and the fixed plate 9 is driven, the upper movable plate 10 is driven up and down. The mold clamping device 2 according to the present illustrative embodiment is provided with a turntable 14 on the fixed plate 9. The turntable 14 rotates 180 degrees around one tie bar 12 in the center, that is, is reversed. The turntable 14 is provided with a lower mold 15L, and the upper movable plate 10 is provided with an upper mold 15U.

Injection Device

The injection device 3 is provided on the upper movable plate 10 of the mold clamping device 2. The injection device 3 includes a heating cylinder 16, a screw (not shown) provided in the heating cylinder 16, a driving mechanism 17 for driving the screw, and an elevating device 18 for elevating the entire injection device 3. In the injection device 3, the screw is rotated to melt the injection material, and the screw is driven in an axial direction to inject the injection material.

Controller

The controller 4 is configured to control the vertical injection molding machine 1. The controller 4 has an operation terminal 19. In the vertical injection molding machine 1, a side on which the operation terminal 19 is provided is called an operation side S. FIGS. 1A and 1B both show the vertical injection molding machine 1 from the operation side S. A side opposite to the operation side S is called a counter-operation side.

Safety Fence

Figure 2A:
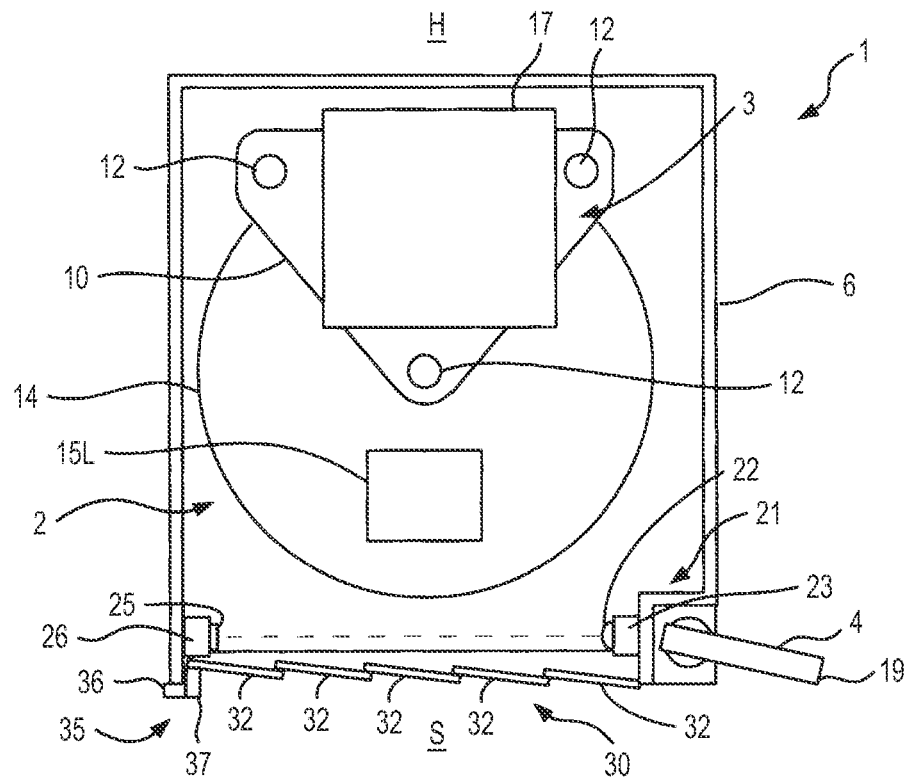
FIGS. 2A and 2B are top views of the vertical injection molding machine according to the present illustrative embodiment.
Figure 2B:
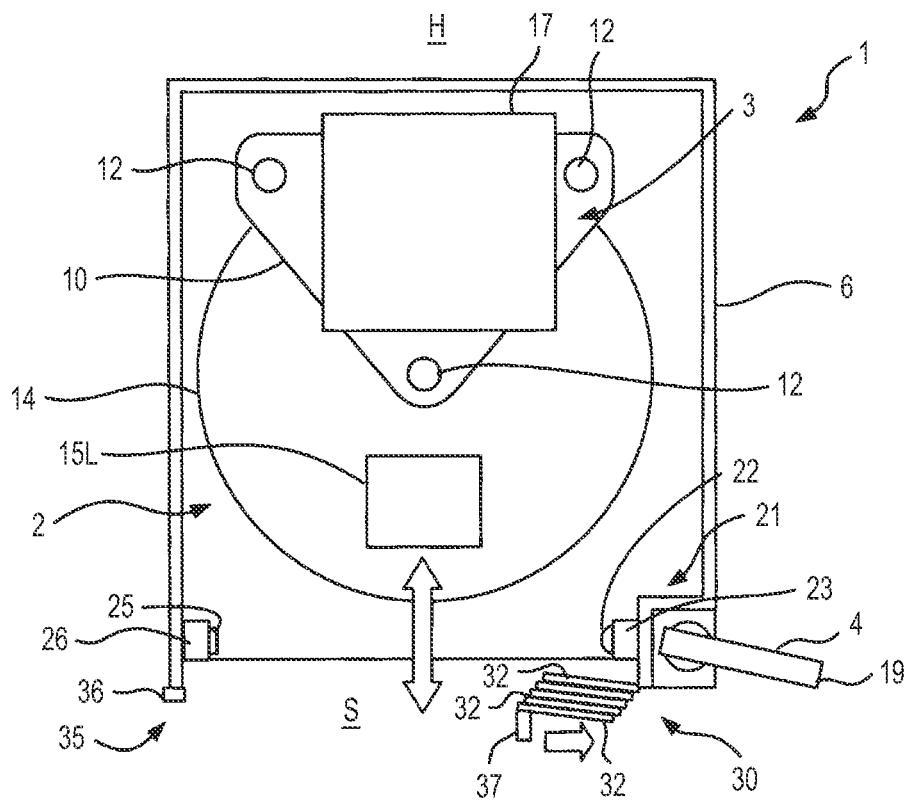

A safety fence 6 according to the present illustrative embodiment is provided with respect to the bed 7. As shown in FIGS. 2A and 2B, which are top views of the vertical injection molding machine 1, the safety fence 6 is provided so as to surround three sides of the vertical injection molding machine 1, that is, the counter-operation side H and both left and right sides of the counter-operation side H. The operation side S is not provided with the safety fence 6 and is open. Since the operation side S is open, a molded product molded in the vertical injection molding machine 1 can be taken out from the operation side S, or an insert product can be inserted from the operation side S in insert molding.

Light Curtain

A light curtain 21 is provided on the operation side S of the vertical injection molding machine 1 according to the present illustrative embodiment as shown in FIGS. 1A to 2B. The light curtain 21 includes a light emitting unit 23 and a light receiving unit 26. The light emitting unit 23 includes a plurality of light sources 22, 22, ... for emitting light of 400 to 1500 nm, for example infrared rays. The light receiving unit 26 includes the same number of light receiving sensors 25, 25, ... for detecting light rays.

In the present illustrative embodiment, as shown in FIG. 1A, the light emitting unit 23 is provided on a post near the operation terminal 19 on the operation side of the vertical injection molding machine 1, and the light receiving unit 26 is provided on the opposite side. The light sources 22, 22, ... are arranged at regular intervals, and optical axes of emitted light form a planar curtain. Therefore, if a hand is inserted into the mold clamping device 2 from the operation side S, the light is blocked and the entry is detected. The light curtain 21 is coupled to the controller 4 so that the controller 4 is notified when an entry from the operation side S is detected.

Cover

As described above, the entry is detected by the light curtain 21 on the operation side S. However, the light curtain 21 is provided at a predetermined height from the bed 7 as shown in FIG. 1A, and can only detect the entry within this range. Then, an operator may put in a hand and reach the injection device 3 from above without being detected by the light curtain 21. Therefore, in the vertical injection molding machine 1 according to the present illustrative embodiment, a cover 30 is provided on the light curtain 21 so as to be adjacent to the light curtain 21. The cover 30 prevents the operator from reaching the injection device 3 and ensures safety.

In the vertical injection molding machine 1, in a case of replacing the molds 15L and 15U, the molds 15L and 15U are generally suspended and transported by a hoist crane or the like. However, when the cover 30 is provided, the molds 15L and 15U are unable be transported by a hoist crane because the cover 30 becomes an obstacle. Therefore, in the present illustrative embodiment, the cover 30 is of a type that can be opened and closed.

Specifically, in the present illustrative embodiment, the cover 30 includes a plurality of boards 32, 32, .... These boards 32, 32 are slidable relative to each other. That is, by sliding the boards 32, 32, ... together, the cover 30 closes the operation side S, or the cover 30 is opened to open the operation side S. FIGS. 1A and 2A show a state in which the operation side S is closed by the cover 30, and FIGS. 1B and 2B show a state in which the operation side S is opened. When the cover 30 is opened as shown in FIG. 2B, the mold 15L can be transported by a hoist crane or the like (not shown).

In the present illustrative embodiment, the cover 30 is provided with a lock mechanism 35 with a limit switch. The lock mechanism 35 with the limit switch is configured to detect an open and closed state of the cover 30 and to maintain the closed state. A lock mechanism main body 36 of the lock mechanism 35 with the limit switch is provided on the safety fence 6 side. A lock key 37 is provided on the cover 30. When a predetermined operation is performed, engagement between the lock key 37 and the lock mechanism main body 36 can be released, and the cover 30 can be opened. The lock mechanism 35 with the limit switch is connected to the controller 4. When the cover 30 is opened, the open state is detected and notified to the controller 4.

Switching of Operation Modes

Figure 3:
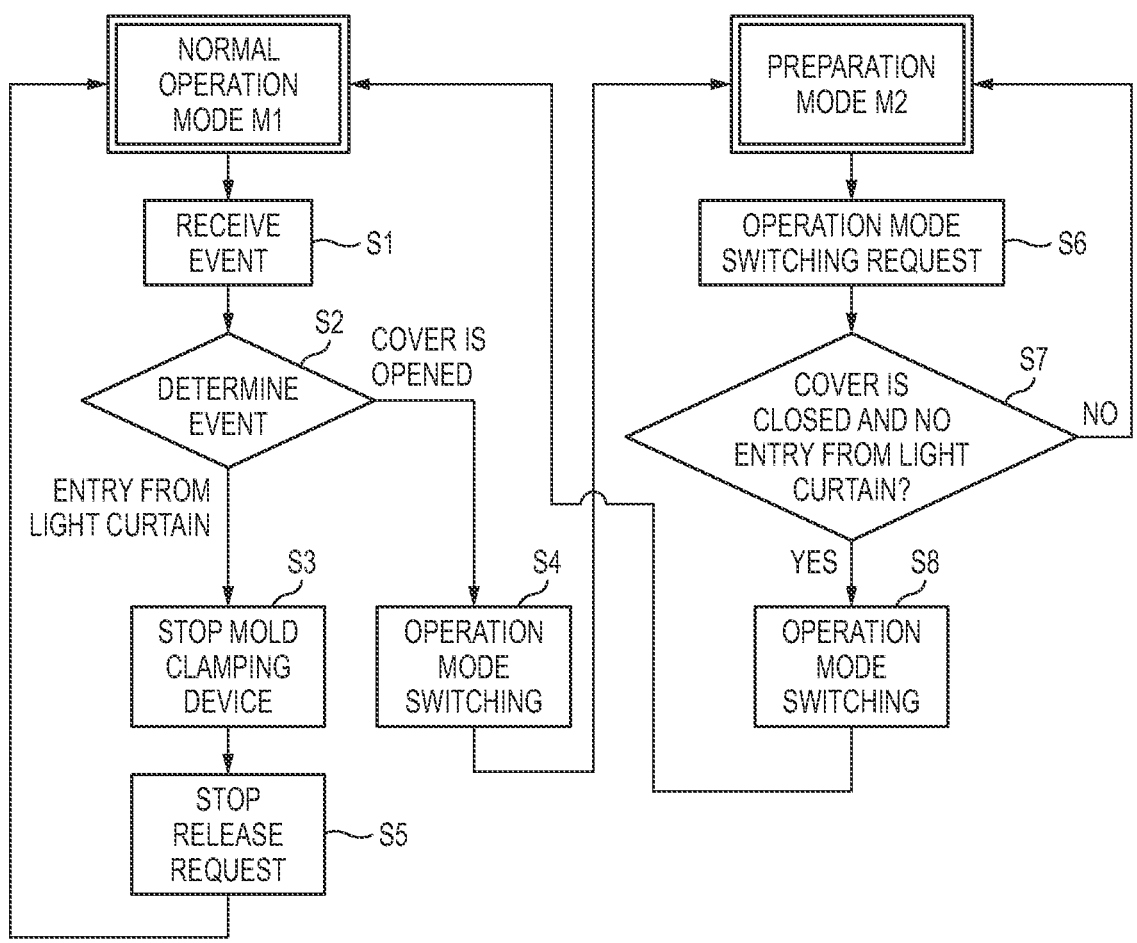
FIG. 3 is a flow chart showing switching of operation modes in the vertical injection molding machine according to the illustrative embodiment.

The vertical injection molding machine 1 according to the present illustrative embodiment includes at least two operation modes M1 and M2 as shown in FIG. 3. A normal operation mode M1 is an operation mode in which the vertical injection molding machine 1 can be controlled without restrictions. A molding cycle is performed in the normal operation mode M1. On the other hand, a preparation mode M2 is a restricted operation mode in which the mold clamping device 2 (see FIG. 1A) is driven at a low speed. Maintenance such as replacement of the molds 15L and 15U should be performed in the preparation mode M2. Accordingly, the safety of the operator is ensured. Switching between the operation modes M1 and M2 is performed by the operator from the operation terminal 19 of the controller 4.

In the vertical injection molding machine 1 according to the present illustrative embodiment, based on detecting an entry state of the light curtain 21 on the operation side S or opening of the cover 30, the controller 4 automatically switches between the operation modes M1 and M2. The switching will be described.

As shown in FIG. 3, description is given from a state in which the normal operation mode M1 is selected in the vertical injection molding machine 1. It is assumed that the hand of the operator enters from the light curtain 21 during the molding cycle. Alternatively, it is assumed that the cover 30 is opened. Then, the controller 4 is notified from the light curtain 21 and the lock mechanism 35 with the limit switch. That is, the controller 4 receives an event (step S1). The controller 4 determines a type of the event (step S2). In a case the event is an entry of the light curtain 21, the controller 4 stops the mold clamping device (step S3). Therefore, safety of the operator is ensured. When the entry state is removed by, for example, the operator withdrawing the hand, a stop release request is made from the operation terminal 19 (see FIG. 1A) (step S5). Then, the state where the mold clamping device is stopped is released, and the operation returns to the normal operation mode M1.

On the other hand, in a case it is determined that the event is the open state of the cover 30 in step S2, the controller 4 performs operation mode switching (step S4). That is, the controller 4 switches the normal operation mode M1 to the preparation mode M2. Thereafter, the vertical injection molding machine 1 is controlled by the preparation mode M2, and the mold clamping device 2 is driven at a low speed.

When the vertical injection molding machine 1 is controlled in the preparation mode M2, the operation mode can be switched only from the operation terminal 19. When the operation terminal 19 is operated to switch to the normal operation mode M1, an operation mode switching request (step S6) is made as shown in FIG. 3. The controller 4 performs step S7 to check whether the cover 30 is in a closed state and whether an entry of the light curtain 21 is detected. In a case where the cover 30 is in the closed state and the entry from the light curtain 21 is not detected, the controller 4 executes step S8 to switch the operation mode. That is, the operation mode is switched to the normal operation mode M1. On the other hand, if the condition is not satisfied in step S7, the preparation mode M2 is maintained.

Figure 4A:
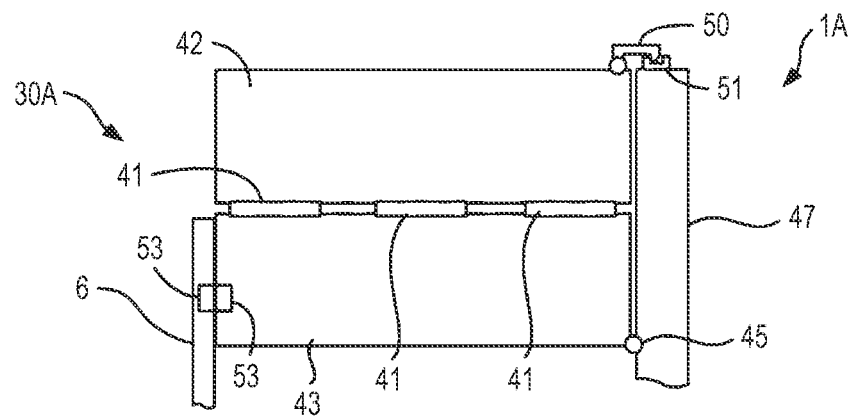
FIGS. 4A to 4C are front views showing a cover according to a second illustrative embodiment.

Vertical Injection Molding Machine According to Second Illustrative Embodiment Various modifications are possible for the vertical injection molding machine 1 according to the present illustrative embodiment. FIG. 4A shows a cover 30A provided in a modified vertical injection molding machine 1A according to a second illustrative embodiment. The cover 30A includes an upper board 42 and a lower board 43 connected to each other by hinges 41, 41, 41. The lower board 43 is provided on a post 47 that configures the safety fence 6 via a hinge 45. A hook 50 is provided on the upper board 42. The hook 50 is engaged with a receiving portion 51 provided on the post 47. Contactless type limit switches 53, 53 are provided between the safety fence 6 and the lower board 43. The contactless type limit switches 53, 53 are configured to detect the open and closed state.

Figure 4B:
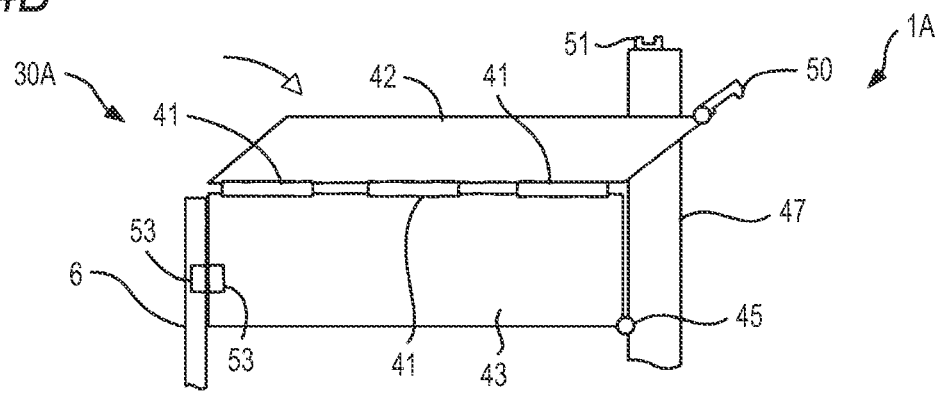
Figure 4C:
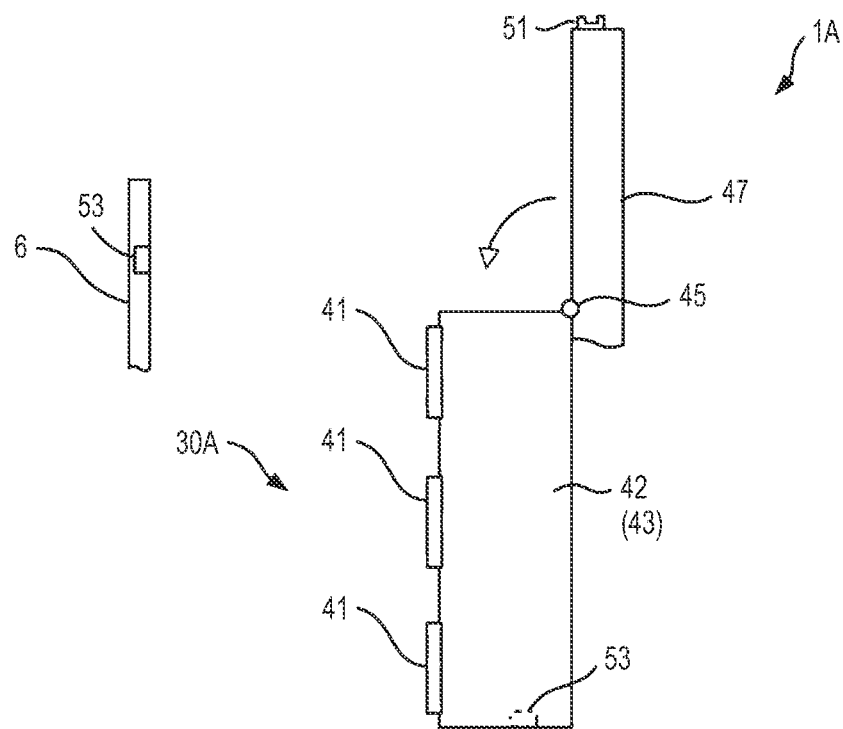

In order to open the cover 30A according to the second illustrative embodiment, the following steps will be performed. First, the hook 50 is removed from the receiving portion 51, and the upper board 42 is rotated to overlap the lower board 43 as shown in FIG. 4B. Then, the upper board 42 and the lower board 43 are rotated together via the hinge 45 as shown in FIG. 4C. As a result, the molds 15L and 15U (see FIG. 1A) can be replaced by a hoist crane without the cover 30A becoming an obstacle.

Other Modifications

There are other modifications of the vertical injection molding machines 1 and 1A according to the present illustrative embodiment. For example, in the above description, the fixed platen 9 is provided with the turntable 14. Alternatively, the turntable 14 may not be provided. The covers 30 and 30A may also be modified. The covers 30 and 30A may not be openable and closable, and may be detachable.

Although the present invention made by the present inventors has been specifically described based on the illustrative embodiments, it is needless to say that the present invention is not limited to the illustrative embodiments described above, and various modifications can be made without departing from the scope of the present invention. A plurality of examples described above can be implemented in combination as appropriate.

What is claimed is:

1. A vertical injection molding machine comprising:
    a mold clamping device configured to clamp a mold;
    an injection device provided on the mold clamping device, the injection device being configured to inject an injection material;
    a controller comprising an operation terminal, the operation terminal provided on an operation side of the vertical injection molding machine; and
    a safety fence surrounding other three sides of the vertical injection molding machine except for the operation side,
    wherein a light curtain and a cover are provided on the operation side,
    wherein the light curtain includes a plurality of spaced light sources and the same number of light receiving sensors, the light curtain being configured to detect an entry into the mold clamping device from the operation side, and
    wherein the cover is disposed on or above the light curtain.

2. The vertical injection molding machine according to claim 1, wherein the cover is detachable or openable and closable.

3. The vertical injection molding machine according to claim 2, wherein the cover is provided with a limit switch, and an attachment and detachment state or an open and closed state of the cover is input to the controller.

4. The vertical injection molding machine according to claim 3, wherein the limit switch comprises a lock mechanism configured to prevent detachment or opening of the cover.

5. The vertical injection molding machine according to claim 3, wherein the controller is configured to restrict control of the vertical injection molding machine according to the attachment and detachment state or the open and closed state of the cover.

6. The vertical injection molding machine according to claim 3,
wherein the cover comprises a plurality of boards connected to each other, and
wherein the plurality of boards are slid to open and close the cover.

7. The vertical injection molding machine according to claim 1,
wherein the cover comprises a plurality of boards connected to each other, the plurality of boards being slidable in a first direction and being overlapped with each other to open the cover, the plurality of boards being slidable in a second direction to close the cover, the second direction being opposite to the first direction.

8. The vertical injection molding machine according to claim 7, wherein the first direction and the second direction are orthogonal to an axial direction of a screw of the injection device.

9. The vertical injection molding machine according to claim 1,
wherein the cover comprises an upper board and a lower board connected to each other by a first hinge, the lower board being provided on a post configuring the safety fence via a second hinge,
wherein the upper board is rotatable between a first position engaging with the post and a second position overlapping the lower board, the second position being lower than the first position, and
wherein the upper board and the lower board which, when being overlapped with each other, are rotatable together via the second hinge between the second position and a third position, the third position being lower than the second position.

* * * * *